United States Patent [19]

Waugh

[11] 4,137,787

[45] Feb. 6, 1979

[54] EMERGENCY STRETCH BELT

[75] Inventor: Dale L. Waugh, Springfield, Mo.

[73] Assignee: Dayco Corporation, Dayton, Ohio

[21] Appl. No.: 849,365

[22] Filed: Nov. 7, 1977

[51] Int. Cl.² ............................ F16G 5/16; B29H 7/22
[52] U.S. Cl. ...................................... 74/233; 74/234;
156/139; 156/142
[58] Field of Search ............... 156/137, 139, 142;
74/233, 234, 231 R, 232, 237, 238

[56] References Cited

U.S. PATENT DOCUMENTS

| | | | |
|---|---|---|---|
| 3,523,462 | 8/1970 | Beindorf | 74/233 |
| 3,987,684 | 10/1976 | Fisher et al. | 74/233 |
| 3,993,522 | 11/1976 | Ballou | 156/137 |
| 4,024,773 | 5/1977 | Hartman et al. | 74/233 |

*Primary Examiner*—Leonard H. Gerin
*Attorney, Agent, or Firm*—Reuben Wolk

[57] ABSTRACT

An emergency stretch belt and a process for making same are described. This belt is capable of an elongation of at least 1½ percent after vulcanization and comprises a body portion of flexible elastomeric material having a load carrying section embedded in the body portion including an undulating strength member.

The belt of this invention is made by assembling a belt structure upon a forming mandrel, placing the belt structure around a curing mandrel having a smaller diameter than the diameter of the forming mandrel, and vulcanizing the belt structure to form a completed belt structure.

26 Claims, 12 Drawing Figures

U.S. Patent Feb. 6, 1979 Sheet 1 of 2 4,137,787
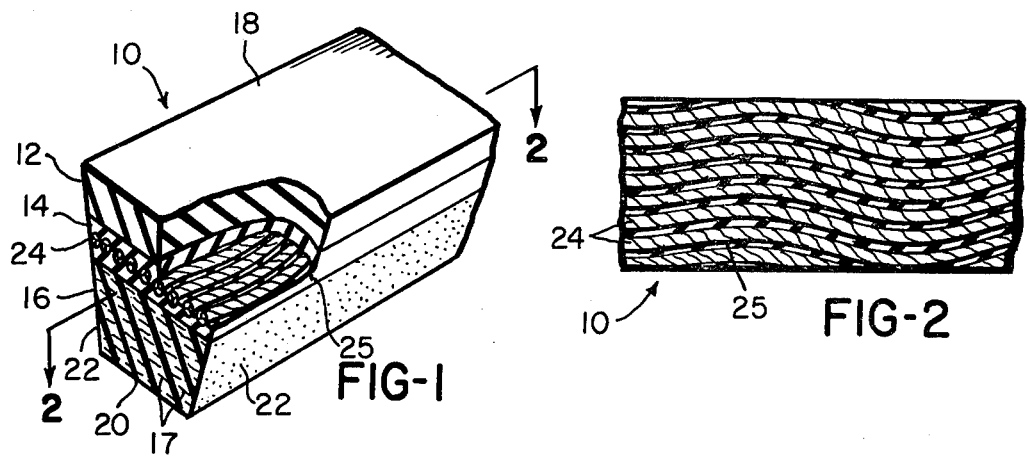
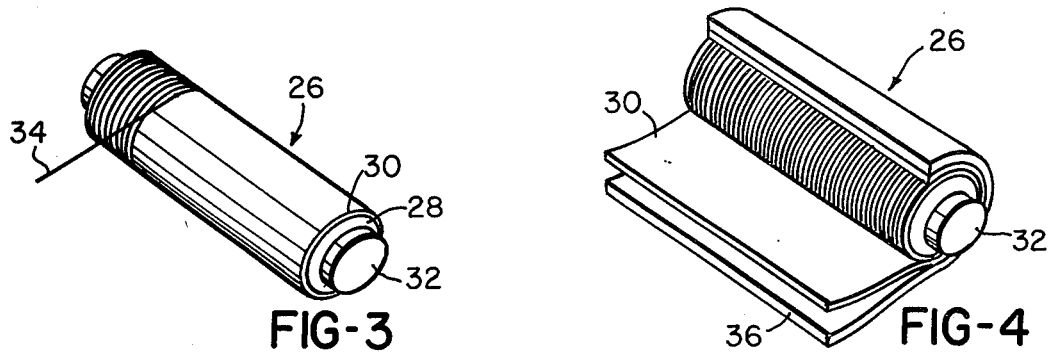
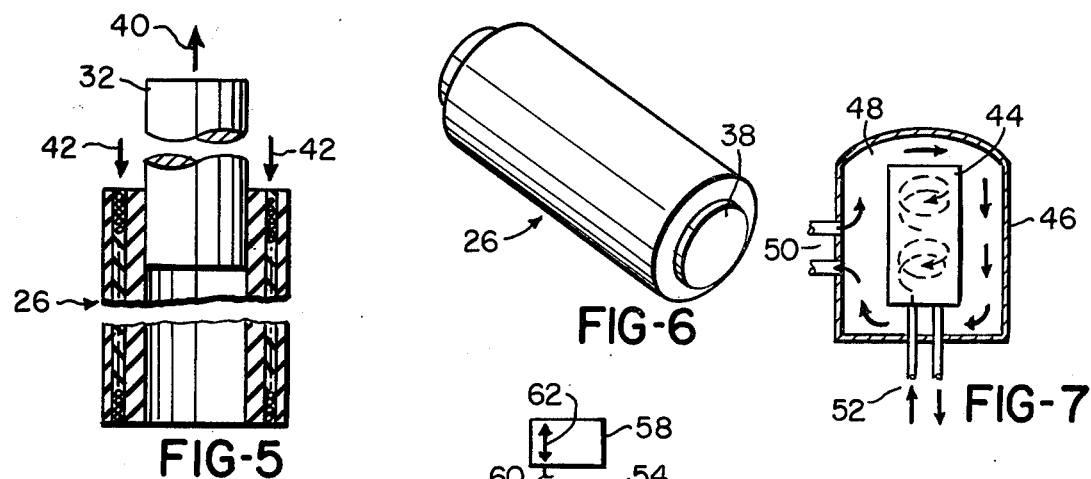
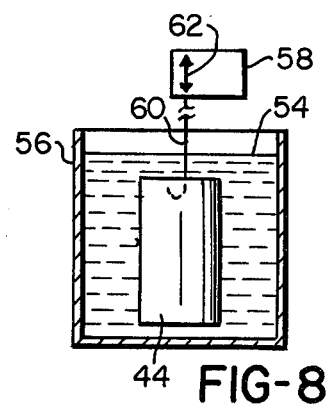

EMERGENCY STRETCH BELT

This invention relates to endless power transmission belts. In particular, this invention relates to extensible power transmission belts.

BACKGROUND OF THE INVENTION

Transmission belts of flexible resilient material such as rubber are normally used in drive belt assemblies to transmit power from a driving pulley by being operably positioned in tension about and in frictional engagement with the driving surfaces of the pulleys. These belts generally contain a load-carrying section of textile cords or square-woven fabric to provide the belt with the necessary longitudinal reinforcement, stability and flexibility.

For proper operation the drive belt must be under proper tension. The tension of the belt is particularly necessary when transmission belts of a generally trapezoidal cross-section, commonly referred to as V-belts, are used since these belts are designed to wedgingly engage the V-shaped grooves of the pulleys or sheaves in order to perform their driving function.

Drive belts can be placed under tension by adjusting the center distance between the driving pulley and the driven pulley. If the pulleys are fixed so that the center distance cannot be adjusted, it is necessary to provide an "idler" or "takeup" pulley which functions to take up the slack resulting from the natural stretch of the belt in order to apply the proper belt tension.

It often happens that a belt must be replaced when the tools necessary to install and properly tension the belt are not readily available. For example, an automobile fan belt may break when the operator is far from home or a service garage. Such a situation clearly calls for an extensible drive belt which can be installed without tools.

While extensible belts are known in the art, such belts have generally required additional, often expensive, processing steps and/or materials. For example, the extensible belt set forth in U.S. Pat. Nos. 3,566,706 and 3,666,584 both to Sidney R. Fix, requires that the load-carrying cords be conditioned in a certain fashion prior to incorporating the cords into a belt body.

It is therefore an object of the present invention to provide an extensible belt.

It is another object of this invention to provide a novel method for making an extensible belt.

Other objects, aspects and advantages of the present invention will be apparent to those skilled in the art from diligent consideration of the following detailed description, the appended claims and the attached drawing.

SUMMARY OF THE INVENTION

In accordance with the present invention there is provided a power transmission belt capable of elongation after vulcanization which comprises a body portion of flexible elastomeric material and a load-carrying section embedded in the body portion including an undulating strength member.

The extensible belt of this invention is made by a process which comprises the steps of a. concentrically assembling layers of elastomeric material and a strength member around a cylindrical forming mandrel to form a belt structure;

b. placing the belt structure around a cylindrical curing mandrel having a smaller diameter than the diameter of the forming mandrel; and c. vulcanizing the belt structure to form a completed belt structure.

BRIEF DESCRIPTION OF THE DRAWING

In the drawing,

FIG. 1 is a perspective view illustrating the belt of this invention;

FIG. 2 is a cross-section taken along lines 2—2 of FIG. 1;

FIGS. 3–10 show the steps of making the belt shown in FIG. 1; and

DESCRIPTION OF THE PREFERRED EMBODIMENTS

Figure 9:
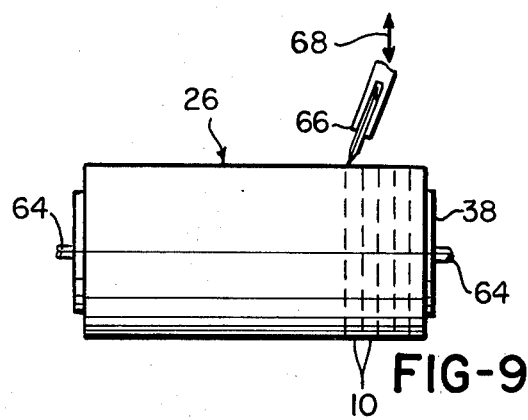

FIGS. 1 and 2 of the drawing illustrate one exemplary embodiment of an endless power transmission belt of this invention which is designed generally by the reference numeral 10. The belt 10 has a substantially trapezoidal cross-sectional configuration and is particularly adapted to be operated in an endless path in a system between a driving pulley or sheave and one or more driven pulleys, as is well known in the art.

The belt 10 is made primarily of elastomeric material and comprises a tension section 12, a load-carrying section 14 and a compression section 16. The belt 10, shown in FIG. 1, is generally free of cover material on the top 18, the bottom 20 and the opposed non-parallel sides 22, whereby the belt 10 is a so-called raw edge belt.

The tension section 12 and the compression section 16 of the belt 10 are comprised of suitable elastomeric materials, which are shown in this example by cross-hatching as a rubber compound.

The elastomeric material which comprises the compression section 16 may be made of an uncured synthetic or natural rubber material such as is well known in the art of manufacturing belts. This material may contain up to about 40 phr of discrete fibers 17 which are oriented about 90° to the longitudinal axis of the belt 10, generally about 0.5 to about 15 phr of such fibers. These fibers may be made of any suitable material such as cotton, rayon, nylon, polyester or the like.

The elastomeric material which comprises the tension section 12 may be made of an uncured synthetic or natural rubber material such as is well known in the art of manufacturing belts.

The load-carrying section 14 comprises a plurality of undulating load-carrying cords 24 embedded in a suitable elastomeric cushion stock 25. The cushion stock 25 may be made of a natural or synthetic rubber material or mixture thereof, such as is well known in the art of manufacturing belts. The strength member can also comprise a stretch fabric, preferably a knit fabric.

The load-carrying cord 24 may be made of such materials as nylon, cotton, rayon, polyester, aramid or glass fibers. These cords are illustrated in FIG. 2 as undulating, in side-by-side relation, in a horizontal plane across the load-carrying section 14 of the belt 10. It is to be understood that these cords may also undulate vertically.

The belt 10 is made by first building up a belt sleeve which is designated generally by the numeral 26 as shown in FIG. 3. The elastomeric material 28 which forms the compression section of the belt and the cushion stock 30 have been wound around a building mandrel 32. A strength cord 34 is spun over the outside of the cushion stock 30 in a well known manner to form a continuous helical cord along the outer surface of the assembly. Following this step the assembly of the belt sleeve 26 is completed as shown in FIG. 4 by wrapping the cord layer with a second layer of cushion stock 30 and surmounting this by an outer elastomeric material layer 36 which comprises the tension section.

The belt sleeve 26 is next removed from the building mandrel 32 as shown in FIG. 5 and installed over a curing mandrel 38 which has a smaller circumference than the circumference of the building mandrel 32 as shown in FIG. 6. In general, the circumference of the curing mandrel is about 1.5 to about 13 percent smaller than the circumference of the building mandrel. A suitable activator 40 is attached to the mandrel 32 and holding means indicated schematically by a pair of arrows 42 is employed to hold the assembly 26 in a substantially stationary position whereupon the mandrel 32 is simply pulled away from the belt sleeve 26. The holding means 42 may be in the form of a plate having a circular opening therein with such opening being dimensioned so as to allow pulling the mandrel 32 therethrough, or the holding means 42 may be in the form of a holding apparatus having a plurality of grasping plates which cooperate to grasp the outside surface of the belt sleeve 26 and hold the sleeve 26 firmly in position while the mandrel 32 is being pulled away by the activator 40. The belt sleeve 26 is then installed over the curing mandrel 38.

After the belt sleeve 26 has been installed around the curing mandrel 38, is compacted or placed under compression by any suitable means, such as by a conventional rag wrapper or rubber curing sleeve. The assembled materials defining the uncured belt sleeve 26, the curing mandrel 38 and the compressive wrapper, not shown, are placed as a unit, which for convenience, is designated by the reference numeral 44, in a suitable curing device 46 as illustrated in FIG. 7. The uncured sleeve 26 is cured or vulcanized in accordance with techniques known in the art and this curing is achieved by introducing steam under controlled temperatures and pressures into and out of the device 46. In particular, steam is introduced into and removed from the volume 48 surrounding the unit 44 as illustrated at 50; and, steam at a controlled temperature and pressure (which may be different than the temperature and pressure of the steam in volume 48) is introduced through the device 46 and within the mandrel 38 as illustrated at 52 whereupon curing and/or vulcanization of the sleeve 26 takes place. The curing device 46 may be of any suitable type known in the art and in the illustration of FIG. 7 is shown schematically as a so-called pot heater.

Following vulcanization, the unit 44, which comprises the sleeve 26, curing drum 38 and the compressive wrapper, is suitably cooled. Although any suitable cooling may be employed the unit 44 is shown in FIG. 8 being cooled by a cold liquid such as cold tap water 54, which is circulated in a continuous manner in a container 56. The cooling action is achieved by immersing the unit 44 in water 54 utilizing any suitable mechanism which is indicated schematically as an activator 58 having a fastening device 60 extending therefrom and the device 60 is fastened at one end to the unit 44 and in particular to the mandrel 38 of such unit and at its opposite end to the activator 58 which is capable of moving unit 44 vertically up and down as shown by the double arrow 62.

The now cured and cooled belt sleeve 26 is cut, as shown in FIG. 9, by supporting the mandrel 38 for rotation on a pair of supports 64, and suitable cutting means, such as rotary cutter 66, is employed to cut the sleeve 26 and define a plurality of endless power transmission belts 10. The cutter 66 may be rotated while rotating the sleeve 26 and may be provided with suitable means indicated by a double arrow 68 to move the cutter 66 toward and away from the sleeve 26. The completed belts are thereafter removed from the mandrel 38.

Figure 10:
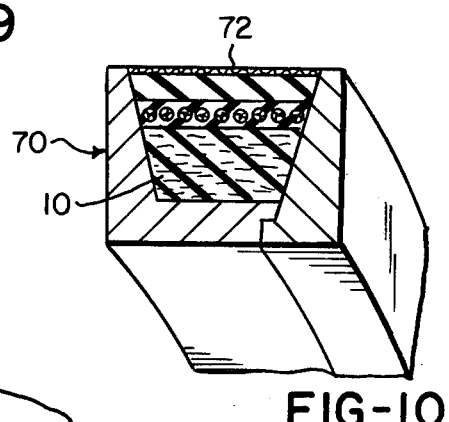

In an alternative manufacturing process, the assembled sleeve 26 can be cut, as shown in FIG. 9, prior to vulcanization. The individual belts 10 are placed in a ring mold 70, as shown in FIG. 10, having the desired shape to which the belt is to be molded and a compressive member, such as, for example, a rag wrapper 72 is applied around the outer surface to compress the belt body 10 so as to make it conform with the mold. The mold and belt body are then placed in a suitable curing device, as previously discussed.

Figure 11:
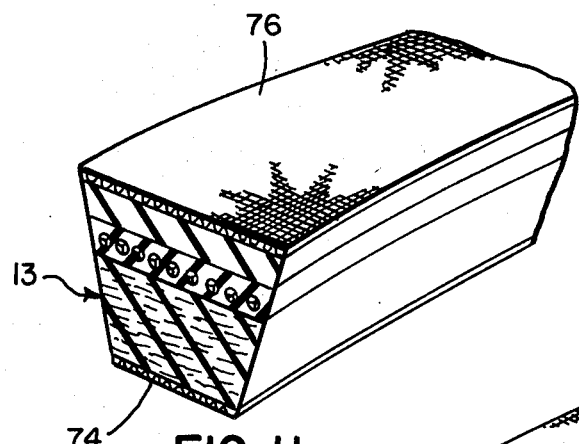
FIGS. 11 and 12 are perspective views illustrating embodiments of the belt of this invention.
Figure 12:
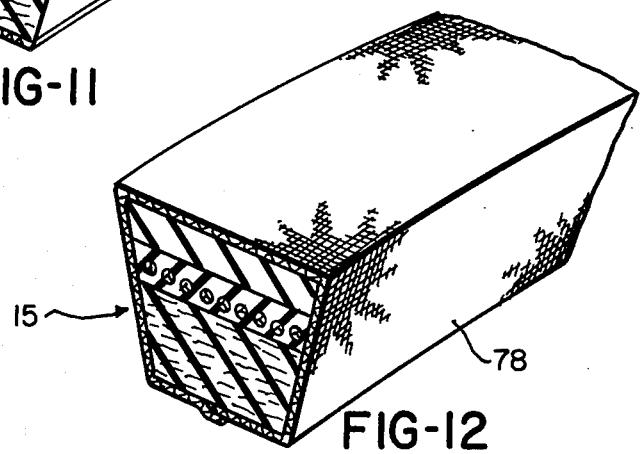

FIGS. 11 and 12 illustrate two additional embodiments of the extensible belt of this invention, wherein the belt 13 is at least partially covered with a suitable stretch fabric. The belt 13 shown in FIG. 11 has a bottom fabric layer 74 and a top fabric layer 76. Referring again to FIG. 3, the belt shown in FIG. 11 is made by winding a layer of stretch fabric 74 around the building mandrel 32 and thereafter successively winding the elastomeric material 28. The first layer of cushion stock 30, the strength cord 34, the second layer of cushion stock 30 and the outer elastomeric material layer 36, followed by winding an outer or top layer of stretch fabric 76 around the assembly. The belt sleeve is then vulcanized and cut into individual belt members, or alternately, cut then vulcanized, as described previously.

The belt 15 shown in FIG. 12 is covered on all sides by a suitable stretch fabric 78. This belt is made according to the alternative process, described previously, except that the individual belt member 15, after cutting, is wrapped with a suitable stretch fabric 78, in accordance with procedures known in the art. The individual belts are then vulcanized as previously described.

Suitable stretch fabrics include knit fabric, stress-relieved fabric, and the like.

The belt of this invention is extensible within certain defined limits and after being vulcanized to a predetermined length less than its installed length is therefore capable of being stretched in order to be installed in a drive belt assembly. Such installation may be accomplished by either pulling or rolling the belt over the edge of the pulleys and onto the pulley surfaces. Such stretching of the belt tends to straighten the undulating load-carrying cord of the finished belt. After the initial stretch required for installation, the cushion stock acts to return the cord to its previous undulating position, thereby retracting the belt to the driving position with respect to the pulleys and maintaining sufficient tension to frictionally engage the pulley surfaces and perform its driving function.

The belt of this invention is capable of being stretched a substantial amount. Since it is obvious that any reinforced belt of elastomeric material may be stretched at least an incremental amount, the term "stretch a substantial amount" is intended to mean more than the amount that any of the essentially inextensible transmission belts may be stretched. More specifically, such term is intended to mean a stretch of at least 1½ percent. In contrast, conventional transmission belts may not be stretched, under normal conditions, much in excess of 1 percent without being permanently damaged.

The belt of this invention is capable of being stretched initially up to about 15 percent of its original free length, thus providing an overall stretch of at least 1½ percent and up to about 15 percent. It will be apparent, however, to those skilled in the art, that the belts shown in FIGS. 11 and 12, being at least partially covered with a suitable stretch fabric are somewhat limited in the amount that these belts can be stretched. These covered belts are capable of a stretch of at least 1½ percent and up to about 5 percent of their original free length.

While certain representative embodiments and details have been shown for the purpose of illustrating the invention, it will be apparent to those skilled in the art that various changes and modifications may be made therein without departing from the spirit or scope of the invention.

I claim:

1. A process for making a power transmission belt structure capable of an elongation of at least 1½ percent after vulcanization, said belt structure comprising a body portion of flexible elastomeric material and a load-carrying section embedded in said body portion including an undulating strength member, said process comprising the steps of:
   a. concentrically assembling layers of elastomeric material and a strength member around a cylindrical forming mandrel to form said belt structure therefrom.
   b. placing said belt structure around a cylindrical curing member, said curing mandrel having a smaller diameter than the diameter of said forming mandrel; and
   c. vulcanizing said belt structure to form a completed belt structure therefrom.

2. The process of claim 1 wherein said assembling step comprises winding a layer of elastomeric material around said forming member to form the compression section of said belt structure, winding a first layer of elastomeric cushion stock around said compression layer, winding a strength member around said cushion stock, winding a second layer of said cushion stock over said strength member, said first and second layers of cushion stock and said strength member forming the load-carrying section of said belt structure, and winding an outer layer of elastomeric material to form the tension section of said belt structure over said second cushion layer.

3. The process of claim 2 wherein said elastomeric material forming said compression contains up to about 40 phr of discrete fibers dispersed therein.

4. The process of claim 3 wherein said elastomeric material contains from about 0.5 to about 15 parts of said fibers per 100 parts of said elastomeric material.

5. The process of claim 2 wherein said strength member is a continuous helically-wound strength cord.

6. The process of claim 2 wherein said strength member is a stretch fabric.

7. The process of claim 6 wherein said fabric is a knit fabric.

8. The process of claim 1 wherein said curing member has a diameter about 1.5 to about 13 percent less than the diameter of said forming member.

9. The process of claim 1 wherein said belt structure is formed in a generally trapezoidal shape.

10. The process of claim 1 wherein said assembling step comprises winding a layer of stretch fabric around said forming member, winding a layer of elastomeric material around said fabric layer to form the compression section of said belt, winding a first layer of elastomeric cushion stock around said compression layer, winding a strength member around said compression layer, winding a second layer of said cushion stock over said strength member, said first and second layers of cushion stock and said strength members forming the load-carrying section of said belt structure, winding a layer of elastomeric material around said second layer of cushion stock to form the tension section of said belt, and winding a layer of stretch fabric over said tension layer.

11. The process of claim 10 wherein said elastomeric material forming said compression contains up to about 40 phr of discrete fibers dispersed therein.

12. The process of claim 11 wherein siad elastomeric material contains from about 0.5 to about 15 parts of said fibers per 100 parts of said elastomeric material.

13. The process of claim 10 wherein said strength member is a continuous helically-wound strength cord.

14. The process of claim 10 wherein said strength member is a stretch fabric.

15. The process of claim 14 wherein said fabric is a knit fabric.

16. The process of claim 1 wherein said belt structure is wrapped with a stretch fabric prior to placing said structure around said curing member.

17. A power transmission belt structure capable of an elongation of at least 1½ percent comprising a body portion of flexible elastomeric material and a load-carrying section embedded in said body portion including an undulating strength member.

18. The belt of claim 17 wherein said body portion comprises an inner compression section, said load-carrying section and an outer tension section.

19. The belt of claim 18 wherein said compression section comprises an elastomeric material containing up to about 40 phr of discrete fibers dispersed therethrough.

20. The belt of claim 19 wherein said fibers are oriented in a direction approximately 90° to the endless path of said belt.

21. The belt of claim 19 wherein said elastomeric material contains from about 0.5 to about 15 parts of said fibers per 100 parts of said elastomeric material.

22. The belt of claim 17 wherein said load-carrying section comprises a plurality of strength cords in side-by-side relation embedded in a cushion stock.

23. The belt of claim 17 wherein said strength member is a stretch fabric.

24. The belt of claim 23 wherein said fabric is a knit fabric.

25. The belt of claim 17 wherein the top and bottom surfaces thereof are covered with a stretch fabric.

26. The belt of claim 17 having a stretch fabric covering on all surfaces thereof.

* * * * *